United States Patent
Poncet

[15] 3,698,693
[45] Oct. 17, 1972

[54] SCREW MIXERS
[72] Inventor: Pierre Poncet, 12 Bis rue Trarieux, Lyon, France
[22] Filed: July 26, 1971
[21] Appl. No.: 165,888

[52] U.S. Cl. .......................... 259/5, 259/6, 259/104
[51] Int. Cl. .............................................. B01f 7/00
[58] Field of Search........ 259/5, 6, 104, 186, 192, 21, 259/40, 41, 42, 103, 102

[56] References Cited

UNITED STATES PATENTS

| | | | |
|---|---|---|---|
| 2,434,707 | 1/1948 | Marshall | 259/104 |
| 2,731,247 | 1/1956 | Hudry | 259/6 |
| 2,868,517 | 1/1959 | Lasch | 259/6 |
| 3,347,528 | 10/1967 | List | 259/6 |
| 3,104,420 | 9/1963 | Selbach | 259/192 |

Primary Examiner—Robert W. Jenkins
Attorney—Arthur E. Dowell, Jr. et al.

[57] ABSTRACT

A screw mixer comprises pairs of conical screws, the screws of each pair being of opposed conicity, closely intermeshing each other and rotating in the same direction (i.e. with their threads moving in opposed direction in the intermeshing zone). The material is thus transferred from one screw to the other one and the threads of a screw have a rubbing cleaning action on those of the other screw. In a modification the threads have a substantial axial clearance and the screws are axially oscillated with respect to each other in order that the outer edge or tip of the relatively narrow plain portions or ribs of the threads of each screw of a pair may scrape the flat bottom of the relatively wide depressions or void spaces which separate the ribs of the threads of the other screw.

7 Claims, 9 Drawing Figures

INVENTOR
Pierre Poncet
BY Alexander McDowell
ATTORNEYS

SCREW MIXERS

This invention relates to mixers wherein the material or materials to be mixed are stirred and propelled by rotating screws.

A disadvantage of these mixers is that some materials have a tendency to stick to the screws to such an extent that the mechanism may become blocked or that at least the operation may be unsatisfactory.

It is an object of the present invention to avoid these inconveniences.

In accordance with the present invention a mixer comprises two intermeshing rotating screws, these screws being conical at least in a portion of their intermeshing zone, with their conicity opposed to each other. With such an arrangement the ratio of the cross-sectional areas of the screws varies regularly between the ends of their conical intermeshing portions. Consequently, considering a material introduced for instance into the larger end of one of the screws so as to be propelled axially towards the smaller end thereof, this material will be compelled to flow in part into the other screw as the diameter of the first one decreases. The material is not therefore only displaced axially, as in conventional screw mixers, but also laterally, which of course greatly improves the mixing action.

In a particular embodiment the protruding portions or ribs of the threads of one screw are located with a substantial axial clearance within the depressions or grooves of the threads of the other screw and the screws are oscillated axially with respect to each other in order to improve the self-cleaning effect of the intermeshing threads.

Figure 7:
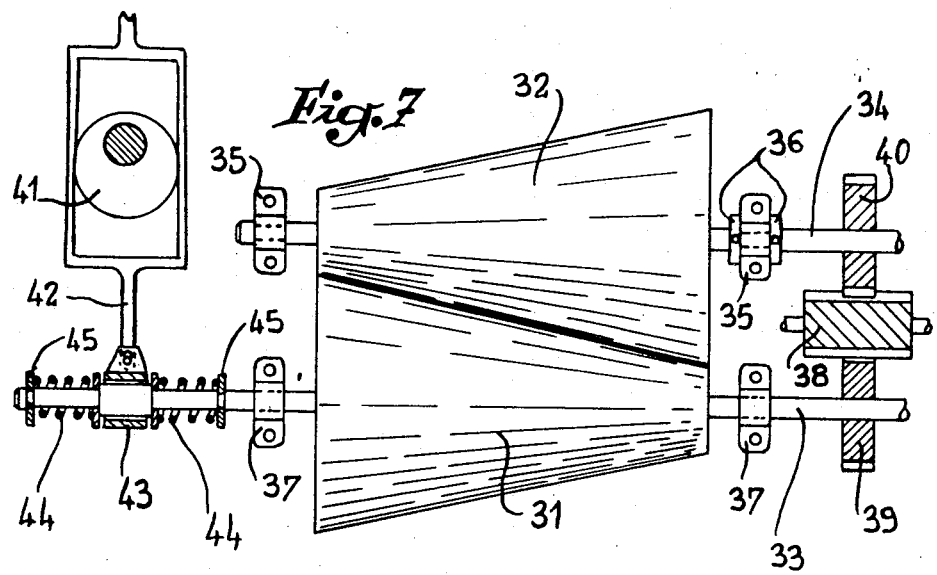

FIG. 7 very diagrammatically illustrates a mixer having a single pair of conical screws, with one screw being oscillated axially with respect to the other one.

Figure 8:
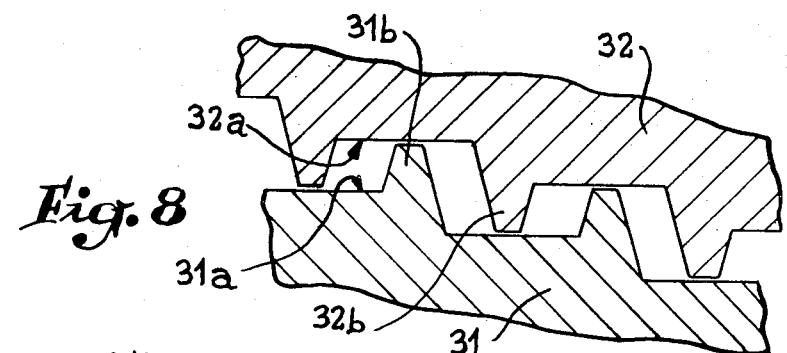
Figure 9:
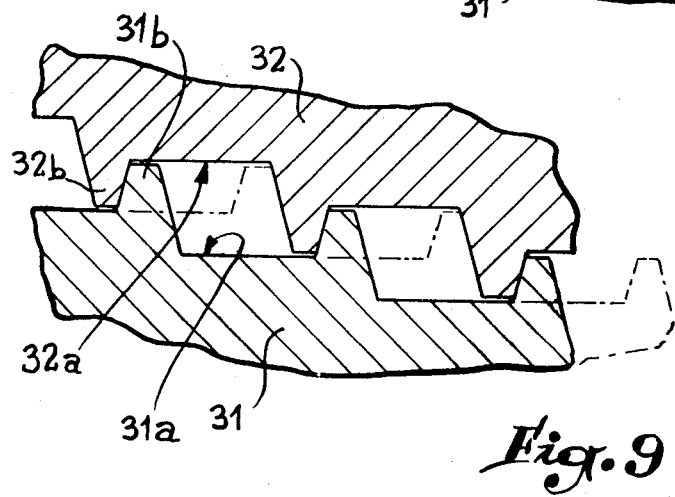

FIGS. 8 and 9 are detail sections showing two positions of the screw threads during the oscillatory displacement of the axially movable screws.

Figure 1:
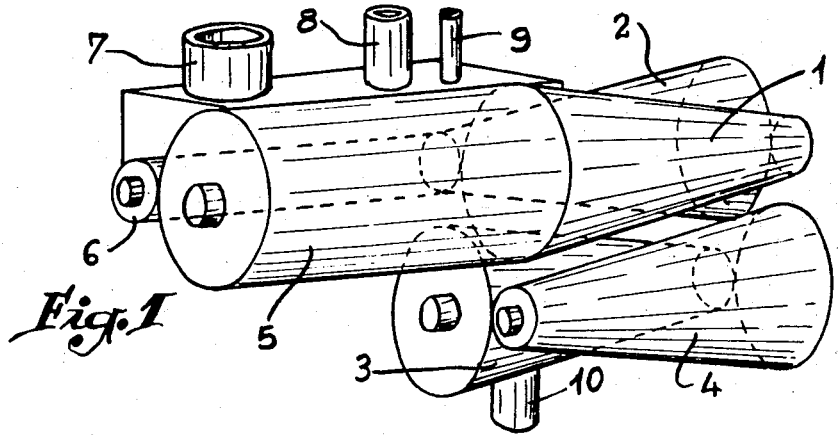
FIG. 1 is a diagrammatical view illustrating the position of the most essential parts in a mixer comprising two pairs of conical screws according to this invention.

In the embodiment very diagrammatically indicated in FIG. 1 the mixer comprises two superposed pairs of conical screws with the conicity of the screws being in opposed direction in each pair. The screws are shown as mere smooth frustro-conical bodies 1 and 2 for the upper pair, and 3 and 4 for the lower one. The conical screws 1, 2 of the upper pair have cylindrical extensions, respectively 5 and 6 adapted to form an inlet feed device to which the material is supplied through a nozzle 7. Reference numerals 8 and 9 designate two auxiliary inlets through which additional substances may be added to the main material. The number of these additional inlets may vary. The outlet 10 is located below the lower pair 3-4, at the end thereof nearest to the main inlet 7.

Figure 2:
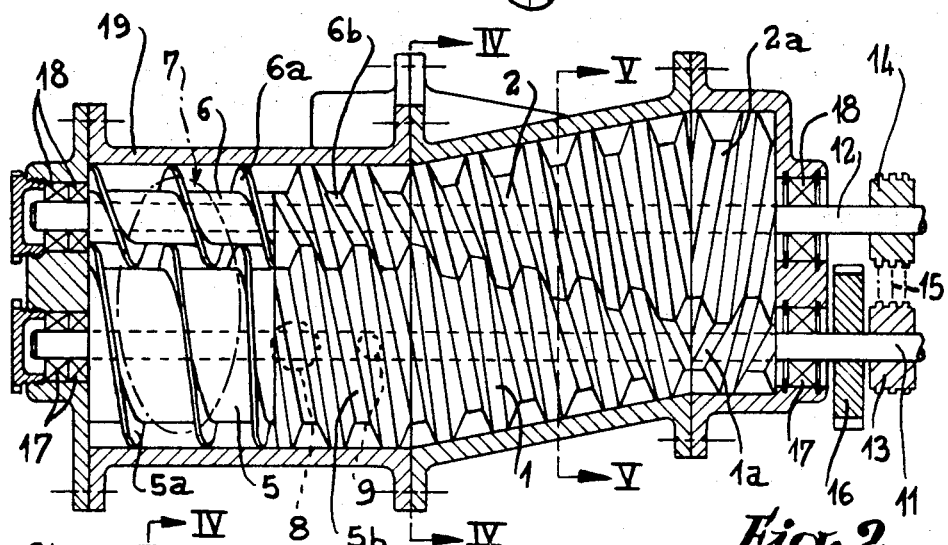
FIG. 2 is a horizontal section taken in the plane of the axes of the screws of the upper pair.
Figure 3:
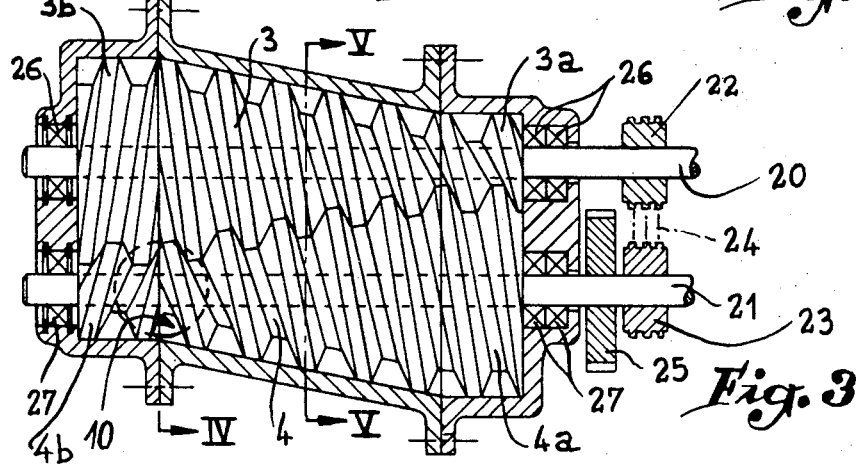
FIG. 3 is another horizontal section corresponding to the plane of the axes of the lower pair.

As illustrated in FIG. 2 screws 1 and 2 have trapezoidal threads which are in close mutual intermeshing engagement without any noticeable radial or axial clearance. Each cylindrical portion 5 or 6 comprises in the vicinity of its free end thin flat threads 5a or 6a with relatively wide intermediate spaces, the pitch of these threads decreasing from left to right. This flat thread zone is followed by another one comprising threads, 5b, and 6b with the same trapezoidal cross-section as the threads of the conical portion of the screws, these threads 5b, 6b being also in close intermeshing engagement. Screws 1 and 2 are respectively carried by shafts 11 and 12 which are connected with each other by sprockets 13 and 14 associated with an endless chain 15. Shaft 11 further carries a connecting spur gear 16. It may be assumed that shaft 11 is the driving shaft of the apparatus and that it extends towards the right to be connected with an appropriate motor, not shown. Shafts 11 and 12 are rotatably supported by anti-friction bearings 17 and 18 mounted in a general casing 19.

It will further be remarked that at the right-hand end of each screw 1 and 2 there is provided a short cylindrical extension having an auxiliary thread 1a, 2a of trapezoidal cross-section but of opposed pitch with respect to the conical portion of the screws, these threads 1a, 2a also being in close intermeshing engagement.

The screws 3 and 4 of the lower pair have threads similar to those of the conical portion of screws 1 and 2. Their right-hand end has also a cylindrical inlet portion 3a, 4a with the same pitch as the conical portion. Their left-hand or outlet end also comprises a cylindrical extension with intermeshing threads 3b, 4b of opposed pitch with respect to the conical portion. Screws 3 and 4 are supported by shafts 20 and 21 connected with each other by sprockets 22, 23 and by a corresponding endless chain 24. Shaft 21 carries a spur gear 25 having the same number of teeth as gear 16 and which meshes with the latter so as to drive the screws of the lower pair. Shafts 20 and 21 are carried by anti-friction bearings 26 and 27 within casing 19.

Figure 4:
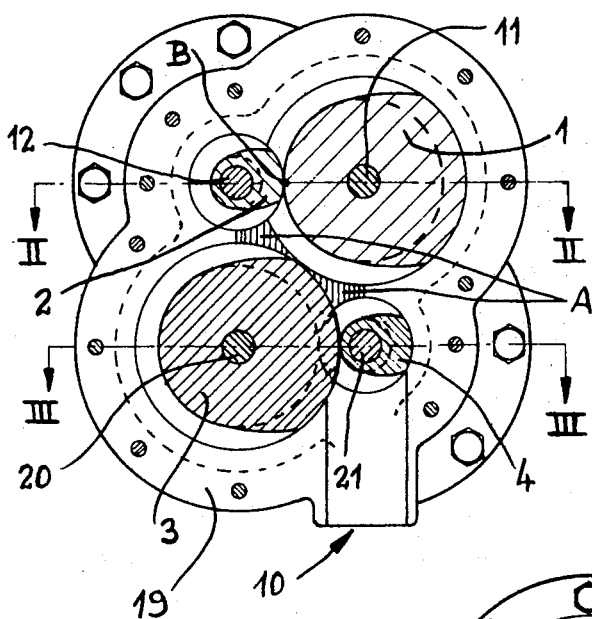
FIGS. 4 and 5 are transverse sections taken through lines IV—IV and V—V (FIGS. 2 and 3).
Figure 5:
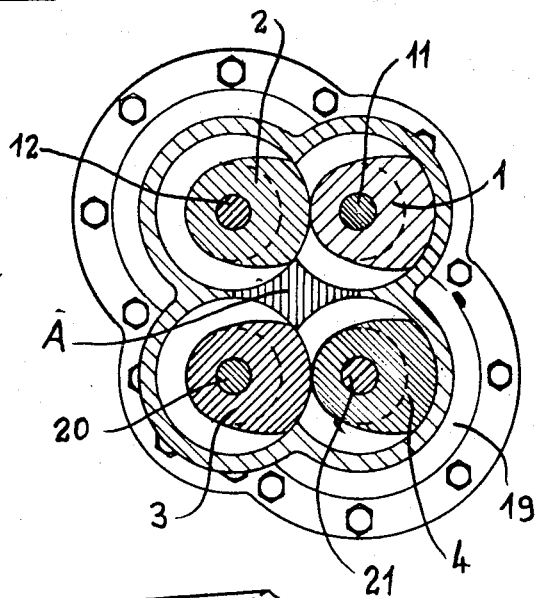
Figure 6:
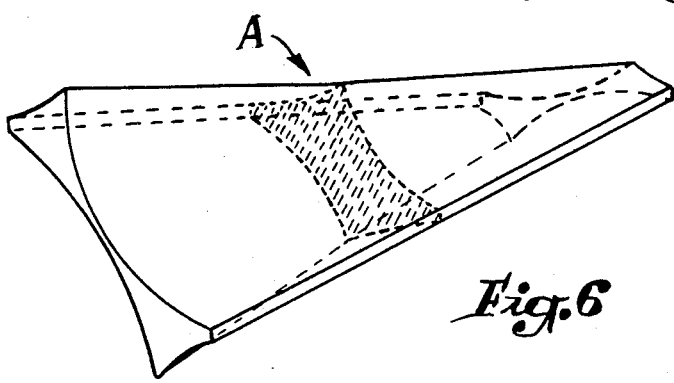
FIG. 6 is a perspective view illustrating the passage provided for the material between the superposed pairs of screws.

As indicated in FIGS. 4 and 5 the superposed pairs of screws do not mesh with each other. They therefore leave between them an intermediate space A which has been indicated by vertical cross-hatching in FIGS. 4 and 5. The cross-sectional profile of this intermediate space varies along the length of the screws. For a better understanding FIG. 6 indicates in perspective the general shape of this space (with an intermediate cross-section illustrated in phantom lines).

It is further to be noted that in each pair the screws rotate in the same direction, their peripheries therefore moving in opposed direction in the vicinity of the nip of the pair. In other words the screws mesh with each other in a sliding manner and not in a rolling manner as this is the case with spur gears or friction wheels.

The mixer described operates as follows:

The material to be mixed is fed through nozzle 7 and it falls between the flat threads 5a and 6a which propel it towards the trapezoidal threads 5b and 6b. Considering for instance a small mass of material between threads 6b above the horizontal plane of the axes of shafts 11 and 12, this mass will be conveyed axially towards the right in FIG. 2 (screws 1 and 2 rotating counter-clockwise in FIGS. 4 and 5) and at the same time it will unavoidably rotate to some extent counter-clockwise with screw 2, until it reaches the meshing point of threads 5b and 6b (point B in FIG. 4). At this point it will be expelled from threads 6b and caught between threads 5b which will again displace the said mass axially towards the right, and so on until it reaches the conical portion of the screws wherein it will again pass from one screw to the other. The mass will thereafter reach the reverse threads of extensions 1a, 2a, by which it will be compelled to flow into the lower pair of screws 3 and 4 which will convey it in the same manner towards outlet 10.

Owing to the opposed conicity of the screws in each pair, the major portion of the material received by the larger end of screw 1 at the inlet end of the mixer is progressively transferred to screw 2, so that the material in general is submitted to a combined axial and transverse displacement. Moreover any small mass of material will repeatedly pass through space A where it will be mixed with the material propelled by the screws of the lower pair.

Owing to the sliding interengagement of the screws the mixer described is self-cleaning, the threads of one screw acting as rubbing surfaces for the threads of the other screw in the same pair.

When the material being mixed is to be submitted to the action of a particular atmosphere, including vacuum, the casing 19 is of course realized under gastight form. It may then be of advantage to provide that the threads of the screws in the second pair be never entirely filled with the material being treated in order to leave free spaces for the passage of gases (evolved or injected) and to increase the area exposed to the inner atmosphere of the mixer. This may be easily obtained either by providing for the second pair screws having in any transverse plane a larger diameter than the screws of the first pair, or by rotating the second pair at a higher angular speed than the first pair.

The modified embodiment as very diagrammatically illustrated in FIG. 7 only comprises a single pair of screws, though another pair could obviously be provided below the one shown in this figure. These screws 31 and 32, which are diagrammatically shown as smooth frustoconical bodies, are respectively supported by shafts 33 and 34. But while shaft 34 is axially retained in its bearings 35 (as diagrammatically shown by abutment rings 36), shaft 33 is free to slide in its own bearings 37. The connection between shafts 33, 34 is insured by an elongated intermediate gear 38 which meshes with gears 39 and 40 respectively carried by the said shafts.

The axial displacement of shaft 33 is controlled by an eccentric 41 which oscillates a lever 42 the free end of which is pivoted to a sleeve 43 loose on the said shaft. On either side of sleeve 43 are disposed springs 44 the outer ends of which act on rings 45 secured to shaft 43. When eccentric 41 rotates, shaft 33 is given a to and fro motion through springs 44 which are normally under compression.

In order to permit this axial reciprocating displacement of screws 31 and 32 with respect to each other, the threads of each of the latter comprise a wide flat-bottomed depression 31a, 32a, parallel to the axis of the screw, and a relatively narrow rib 31b, 32b which comes substantially into contact with the bottom of the depression of the other screw in the intermeshing plane of the pair, as indicated in FIG. 8 wherein screw 31 is shown at a position midway of its stroke. Furthermore the controlling gearing 41–42–43 is so arranged that at each dead point of the reciprocation axial motion of screw 31 one of the sides of the ribs 31b thereof is substantially in contact with one of the sides of the ribs 32b of screw 32, as indicated in FIG. 9 in full lines for the left-hand dead point and in phantom lines for the right-hand one. In this manner the threads of one screw are regularly cleaned by those of the other one even in the case of quite sticky materials either by the scraping effect of the tips of the ribs on the bottom of the depressions, or by the rubbing action of the sides of the ribs of a screw against the sides of the ribs of the other screw, these sides moving in opposed direction in the intermeshing zone, as above explained.

If a hard solid body or an entanglement of fibrous substances becomes jammed between the sides of the threads, springs 44 yield to some extent thus preventing any damage to the mechanism.

In order to avoid that the screws contact each other by the same portions of their periphery, which could entail in some cases a too localized wear, it may be of advantage to arrange the driving mechanism of cam 41 in such manner that its frequency and the angular speed of shafts 33, 34 (expressed in revolutions per unit of time) have no common multiple of relatively low value. For instance if cam 41 and shafts 33, 34 are connected by toothed gears having a transmission ratio of 50/51, screws 31 and 32 will only be at the same angular and axial position each 2,550th revolution. In other words the wear will be distributed on 2,550 points of the periphery of each individual thread, i.e., practically speaking along the whole periphery thereof. A similar result may be obtained by means of a frictional transmission, for instance belt and pulleys, owing to the irregular slip which occurs unavoidably in such transmissions.

The ribs 31b, 32b may have a more or less blade-like outer edge, more particularly in the case of fibrous materials.

I claim:

1. A screw mixer comprising:
   A pair of rotating screws each including a conical portion with the conicities of the said conical portions being opposed to each other and with the threads of said conical portions having the same pitch and being in substantially close intermeshing engagement, said pair having a first end and a second end;
   a casing to enclose said pairs of screws;
   means to rotatably support said screws within said casing;
   means to rotate said screws at the same angular speed and in the same direction within said casing;
   inlet means to feed materials to the first end of said pair of screws, said materials being propelled by said screws from said first end to said second end;
   and outlet means for the material issuing from the second end of said pair of screws.

2. In a screw mixer as claimed in claim 1, each of said screws including a substantially cylindrical inlet portion at the first end of said pair, with each of said cylindrical inlet portions having threads which intermesh with the threads of the other one of said cylindrical inlet portions, said threads of said cylindrical inlet portions having a pitch of the same direction as the threads of said conical portions.

3. In a screw mixer as claimed in claim 1, each of said screws including a substantially cylindrical outlet portion at the second end of said pair, with each of said cylindrical outlet portions having threads which intermesh with the threads of the other one of said cylindrical outlet portions, said threads of said cylindrical outlet portions having a pitch of opposed direction with respect to the threads of said conical portions, and said outlet means being substantially situated at least in part upstream of said cylindrical outlet portions in the direction of travel of said material along said screws.

4. A screw mixer as claimed in claim 1, further comprising:
a second pair of rotating screws, also each including a conical portion with the conicities of the said conical portions of the screws of said second pair being opposed to each other and having threads of the same pitch in substantially close intermeshing engagement, said second pair also having a first end and a second end;
means to rotatably support the screws of said second pair within said casing at such a juxtaposed position with respect to the screws of said first pair that the four screws of both pairs define between them an intermediate passage of transversely elongated cross-section for the material being treated;
and means to rotate the screws of said second pair in such a direction that they propel the material from the first end of said second pair to the second end thereof in the opposed direction with respect to the screws of the first pair, with the first end of said second pair being adjacent to the second end of the first pair, and with said outlet means receiving the material from the second end of said second pair.

5. A screw mixer comprising:
a pair of intermeshing rotating screws having threads of the same pitch, the threads of each screw including relatively narrow ribs separated from each other by relatively wide flat-bottomed depressions;
means to rotatably support said screws at such a mutual parallel position that the ribs of each come close to the bottom of the depressions of the other;
means to rotate said screws at the same angular speed and in the same direction;
and means to oscillate axially said screws with respect to each other to cause the ribs of each screw to move to and fro within the depressions of the other screw.

6. In a mixer as claimed in claim 5, each of said screws having a conical portion with said conical portions being of opposed conicities.

7. In a mixer as claimed in claim 5, resilient means associated to said oscillating means to limit the oscillating stresses applied to said screws.

* * * * *